UNITED STATES PATENT OFFICE 2,415,699

POUR DEPRESSOR

Eugene Lieber, New York, N. Y., assignor to Standard Oil Development Company, a corporation of Delaware No Drawing. Application January 1, 1944, Serial No. 516,709

18 Claims. (Cl. 252—51.5)

The present invention relates to a novel type of chemical condensation product and to methods of preparing such products and using them for various purposes, more particularly as additives for mineral oils.

Broadly, the invention comprises the production of condensation products having wax-modifying properties, by chemically condensing a nitrile having the general formula:

R—CN where R is a hydrocarbon radical, preferably an aliphatic hydrocarbon radical derived from a fatty acid, with a halide selected from alkyl halides and acid halides of the formula:

R'—CO—X where R' is an aliphatic, aromatic, aralkyl or heterocyclic group, and X is a halogen preferably chlorine. At least one of R and R' should contain at least 5 aliphatic carbon atoms, and both together should contain at least 10 and preferably at least 15 aliphatic carbon atoms. Mixtures of organic acid halides, alkyl halides and nitriles, such as produced from the mixed fatty acids of commerce, may be used.

The reactions involved may be represented by the equation:

RCN+R'X→HX↑
　　　　　　+complex condensation product
RCN+R'COX→HX↑
　　　　　　+complex condensation product This condensation is preferably carried out by the use of a Friedel-Crafts catalyst.

The nitriles, which are used in the practice of this invention are preferably fatty nitriles, e. g., acetonitrile, propionitrile, octadecylnitrile. Aromatic nitriles, e. g., benzonitrile, may also be used, as well as mixed aromatic, aliphatic nitriles. Examples of the fatty acid chlorides are acetyl chloride, valeryl chloride, oleyl chloride, stearyl chloride, behenyl chloride, succinyl chloride, adipyl chloride. Aromatic acid chlorides, e. g., benzoyl chloride C6H5COCl, phthalyl chloride, as well as naphthenic acid chlorides derived from petroleum can also be used. In place of the "acyl halides," various types of "alkyl" halides can be used, e. g., amyl chloride, octadecyl bromide, chlorinated kerosene, chlorinated paraffin wax, chlorinated white oil.

The Friedel-Crafts catalyst to be used in effecting this condensation is preferably anhydrous aluminum chloride, although other Friedel-Crafts catalysts can be used, such as boron fluoride, ferric chloride, zinc chloride, and hydrogen fluoride.

The use of an inert diluent or solvent, especially one which is a good solvent for the resulting high molecular weight condensation products, is optional but is preferred and, if used, should be present in about ½ to 10 volumes, preferably 1–5 volumes per volume of total reactants and catalyst.

The proportion of nitrile to fatty acid chloride and/or alkyl chloride can be varied over a wide range, but should generally be about 50 to 300 parts by weight of nitrile per 100 parts by weight of halide. The optimum proportions, naturally, will vary with the particular nitrile and halide used and this is readily determined by experiment.

In carrying out the invention, the operating conditions to be used should include a temperature between the approximate limits of room temperature and 300° F., preferably mixing the reactants and catalyst at about room temperature and then, after any initial reaction has begun to subside, heating the reaction mixture to a final temperature of about 150–300° F. with a reaction time of about ½ to 10 hours, usually about 1 to 5 hours. The reactants and catalyst can be mixed in any desired order; for instance, the nitrile and fatty chloride can be mixed together first with or without solvent and then the catalyst added, or the catalyst may be mixed with the nitrile and the fatty acid chloride or alkyl halide subsequently added.

After the reactants and the catalyst have been mixed together and after the reaction mixture has been heated to the desired final temperature for a sufficient time to complete the reaction, the reaction mixture is cooled, diluted with a convenient volume of kerosene, light chlorinated hydrocarbon or other suitable diluent, and neutralized by any of the methods familiar to the Friedel-Crafts art, i. e., by adding water, alcohol, dilute aqueous caustic soda solution, etc., a mixture of alcohol and water being very suitable. The reaction mixture is then separated as by settling into two layers, the aqueous layer containing the aluminous sludge being removed, and the solvent extract, after washing with water, is then distilled with fire and steam or with vacuum (e. g., 5–50 mm. absolute Hg pressure) to a temperature of about 450° to 600° F. to remove solvent and low-boiling products. The distillation residue constitutes the desired condensation product of this invention.

This condensation product which is usually a brown viscous oil is a complex high molecular weight substance containing nitrogen, as well as carbon and hydrogen, having wax modifying properties, i. e., it reduces the pour point of waxy mineral lubricating oils when added thereto in small amount, e. g., about .1% to 10%, although usually about 0.5% to 5% will be found to be the most practical concentration. The products also have marked "anti-rust" properties and therefore are useful in anti-rust coating compositions to protect metal surfaces against oxidation, weathering, etc., and in extreme pressure lubricants to prevent rusting or corrosion due to active chlorine or sulfur contained therein; for such purposes usually 0.1%–2.0% by weight is sufficient, and may be used in any mineral oil such as gasoline, Diesel fuel, wax compositions, etc. as well as lubricating oils. The invention will be better understood from a consideration of the following experiment which is given for sake of illustration but without intending to limit the invention to the particular materials or operation conditions used.

Example 1

One hundred parts of n-octadecane nitrile and 10 parts of anhydrous AlCl₃ are placed in a round bottom flask equipped with a mechanical agitator, condenser, and thermometer. The temperature is adjusted to 125° F. and while stirring 100 parts of stearyl chloride are added drop by drop. After the addition of the stearyl chloride, the reaction temperature is raised to 250° F. and maintained thereat until the evolution of hydrogen chloride gas has substantially subsided, indicating completion of the reaction. After cooling, the AlCl₃ is destroyed and the product recovered as described above. A bottoms residue comprising a viscous oil is obtained as the desired product.

When a small concentration of this product, prepared as described above, is added to a waxy oil, a considerable lowering of the pour point is obtained.

Example 2

200 grams of fatty nitriles, comprising essentially octadecyl nitrile, is dissolved in 200 cc. tetrachlorethane as solvent and treated with 30 grams of aluminum chloride with suitable agitation. 100 grams of olelyl chloride is then added drop by drop at a temperature of 200° F. The olelyl chloride is added in 15 minutes. After the addition of the olelyl chloride, the reaction temperature was increased to 250° F. and maintained thereat for 2½ hours. After cooling, the aluminum chloride was destroyed and the product recovered by a fire and steam distillation to 600° F. A bottom yield of 160 grams of a dark brown viscous oil was obtained as product.

The pour depressor potency of the condensation product prepared as described above was tested by blending in a waxy hydrocarbon oil and the pour points determined by the regular ASTM procedure. The following data were obtained:

| Material tested | Pour point, °F. |
|---|---|
| Oil | +30 |
| Oil plus 2½% condensation product | −10 |
| Oil plus 5% condensation product | −15 |

Example 3

200 grams of benzyl nitrile was dissolved in 200 cc. of ethylenedichloride as solvent followed by the addition of 60 grams of aluminum chloride. 100 grams of stearyl chloride was then added drop by drop over a period of 30 minutes at a temperature of 200° F. The reaction temperature was then increased to 220° F. and maintained thereat for two hours. After cooling and destroying the aluminum chloride, the product was recovered by a fire and steam distillation to 600° F. A bottoms yield comprising 64 grams of a brown viscous oil was obtained as product.

The pour depressor potency of the condensation product prepared as described above was tested in the same manner as that in Example 2.

| Material tested | Pour point, °F. |
|---|---|
| Oil | +30 |
| Oil plus 2½% condensation product | 0 |

Example 4

The following proportion of reagents were used:

Fatty nitriles (essentially octadecyl nitrile) grams__ 200
Oleyl chloride _____ do____ 150
Aluminum chloride as catalyst _____ do____ 30
Tetrachlorethane as solvent _____ cc__ 200

The procedure used in Example 2 for carrying out the reaction and for recovery of product was followed exactly. 207 grams of product was obtained, comprising a dark brown viscous oil, which on analysis showed a nitrogen content of 2.26%.

The pour depressor potency was tested as previously described, the following data being obtained:

Pour point, °F.
Oil _____ +30
Oil+2.5% of condensation product _____ −10
Oil+5.0% of condensation product _____ −15

Example 5

The condensation product prepared as described in Example 4 was tested as an "anti-rusting" agent to form an improved lubricant intended for the lubrication of moving metal parts which come into contact at high pressures, especially the so-called "extreme pressure" lubricants.

In the lubrication of hypoid and other gears, various materials containing chlorine or other halogens are used alone or in combination with other materials effective in increasing the extreme pressure lubricant characteristics of the composition, such as sulfur or phosphorus compounds. These compositions have a serious disadvantage, however, in that they tend to rust the metal surfaces which are being lubricated. They also cause corrosion and staining of ferrous and copper-bearing alloys used in the bearings, bushings, pistons, etc. Also, the use in cutting fluids of sulfur or sulfur compounds alone or in the presence of chlorine compounds, usually causes a black stain of copper sulfide on copper alloys.

A lubricant was prepared having the following composition:

Per cent
Extreme pressure additive (commercially known as "Parapoid" and prepared essentially according to U. S. 2,124,598) _____ 10
Lubricating oil _____ 89
Condensation product of Example 4 _____ 1

The test machine was the "S. A. E. extreme-pressure lubricant testing machine," as described in Federal Specification VV–L–761, dated September 1, 1942. The test procedure comprised the following steps:

1. Set up the S. A. E. load bearing machine in the usual way.
2. Give the test piece a 30-second break in with 20 pounds scale load.
3. Increase the scale load to 50 pounds and run for 5 minutes.
4. Remove the test pieces, place in beakers, and set in a closed container (desiccator) over a saturated solution of sodium carbonate. Maintain test pieces at room temperature for 24 hours, rinse test pieces with naphtha and then examine visually for rusting.

A control test was run using a blend of 90% lubricating oil plus 10% parapoid additive. The following data was obtained:

Per cent of total area of test rings rusted
Lubrication + Parapoid_____ 75
Lubricant + Parapoid + Example 4 condensation product_____ 2

It will be noted that the condensation product of Example 4 is a very potent "anti-rust" agent.

*Example 6*

The following proportion of reagents were used:

Fatty nitriles (essentially octadecan-nitrile)_____grams__ 200
Cottonseed fatty acid chloride_____do____ 100
AlCl3 _____do____ 30
Tetrachlorethane as solvent_____cc.__ 200

The procedure used in Example 2 for carrying out the reaction and for recovery of product was followed exactly. 226 grams of a dark brown viscous oil was obtained as product.

The pour depressor potency was tested as previously described. The following data was obtained:

Pour point, °F.
Original oil_____ +30
Original oil +2.5% of condensation product_____ −10
Original oil +5.0% of condensation product_____ −20

*Example 7*

The following proportion of reagents were used:

Fatty nitriles (essentially octadecan-nitrile)_____grams__ 200
Stearyl chloride _____do____ 100
AlCl3 _____do____ 30
Tetrachlorethane as solvent_____cc.__ 200

The procedure used in Example 2 for carrying out the reaction and for recovery of product was followed exactly. 140 grams of a viscous dark brown oil was obtained as product. Analysis showed this material to contain 2.54% nitrogen.

The pour depressor potency was tested as previously described. The following data was obtained:

Pour point, °F.
Original oil_____ +30
Original oil + 2.5% of condensation product_____ −15
Original oil + 5.0% of condensation product_____ −20

The "anti-rusting" properties were tested as described in Example 5. The following data was obtained:

Per cent of total area of test rings rusted
Lubricant + E. P. agent_____ 75
Lubricant + E. P. + condensation product___ 22

It is not intended that this invention be limited to the specific materials which have been given merely for the sake of illustration, nor unnecessarily by any theory suggested as to the mechanism of the operation of the invention, but only by the appended claims in which it is intended to claim all novelty inherent in the invention as well as all modifications coming within the scope and spirit of the invention.

I claim:

1. Process which comprises treating about 50 to 300 parts by weight of a mixture of an organic nitrile having the general formula RCN where R is an aliphatic hydrocarbon group and 100 parts by weight of an organic halide selected from the organic acid halides and alkyl halides with a Friedel-Crafts catalyst, at a temperature within the range from about room temperature to 300° F. for a period of about ½ to about 10 hours.

2. Process according to claim 1 in which the nitrile and organic halide have at least a total of 10 aliphatic carbon atoms.

3. Process according to claim 1 in which the nitrile and halide each have at least 10 aliphatic carbon atoms per molecule.

4. Process according to claim 1 carried out with a maximum reaction temperature of about 150–300° F.

5. Process according to claim 1 carried out in the presence of a solvent.

6. Process which comprises reacting fatty nitriles comprising essentially octadecyl nitrile with a fatty acid chloride in the presence of a Friedel-Crafts catalyst with a maximum reaction temperature of between about 150 and 300° F., hydrolyzing and removing the catalyst and distilling the reaction product under reduced pressure to about 600° F. to obtain the desired product as distillation residue.

7. The process according to claim 6 carried out with oleyl chloride, aluminum chloride and inert solvent.

8. Process which comprises reacting about 200 parts by weight of fatty nitriles comprising essentially octadecyl nitrile with about 100 parts by weight of oleyl chloride in the presence of about 30 parts by weight of aluminum chloride and about 200 parts by volume of tetrachlorethane as solvent, using a reaction temperature of about 200–250° F., hydrolyzing and removing the aluminum chloride catalyst while subjecting the reaction mixture to fire and steam distillation to about 600° F. to remove solvent and low boiling condensation products and to obtain the desired product as distillation residue.

9. A product comprising essentially a Friedel-Crafts condensation product of an organic nitrile having the general formula RCN where R is an aliphatic hydrocarbon group with an organic halide selected from the organic acid halides and alkyl halides, said products being substantially non-volatile up to about 600° F. under a reduced pressure at least as low as about 50 millimeters mercury absolute.

10. Product comprising essentially a high molecular weight polymeric Friedel-Crafts condensation product of a fatty nitrile and a fatty acid chloride, said product being a viscous oil soluble in mineral oils and having wax modifying properties, and said products being substantially non-volatile up to about 600° F. under reduced pressure at least as low as about 50 millimeters mercury absolute.

11. Product comprising essentially a high molecular weight polymeric Friedel-Crafts condensation product of octadecyl nitrile and oleyl chloride, said product being a viscous oil soluble in mineral oils, and also being substantially non-volatile up to about 600° F. under reduced pressure, and having wax modifying properties.

12. A Friedel-Crafts condensation product of a fatty nitrile with chlorinated paraffin wax.

13. A composition comprising a major proportion of a mineral oil and at least a pour depressing amount of the product described in claim 9.

14. A lubricant comprising a mineral lubricating oil and at least a pour depressing amount of a condensation product as described in claim 10.

15. A lubricant comprising a major proportion of waxy mineral lubricating oil and a small but pour depressing amount of a high molecular weight polymeric Friedel-Crafts condensation product of a fatty nitrile with a fatty acid halide.

16. A lubricant comprising a major proportion of a waxy mineral lubricating oil and a small but poor depressing amount of a high molecular weight viscous oil-soluble polymeric Friedel-Crafts condensation product of octadecyl nitrile with oleyl chloride, said condensation product being substantially non-volatile at temperatures up to about 600° F. under reduced pressure.

17. A lubricant comprising a major proportion of a waxy mineral lubricating oil and a small but pour depressing amount of a Friedel-Crafts condensation product of a fatty nitrile with chlorinated paraffin wax.

18. An extreme pressure lubricant comprising a mineral oil basestock, and extreme pressure agent containing active chlorine, and at least a rust-inhibiting amount of anti-rust agent comprising the product described in claim 9.

EUGENE LIEBER.

REFERENCES CITED

The following references are of record in the file of this patent:

UNITED STATES PATENTS

| Number | Name | Date |
|---|---|---|
| 2,300,291 | Jolly | Oct. 27, 1942 |
| 2,299,755 | Jolly | Oct. 27, 1942 |
| 2,125,853 | Ralston | Aug. 2, 1938 |
| 2,326,222 | Hopff et al. | Aug. 10, 1943 |
| 2,175,092 | Ralston | Oct. 3, 1939 |

FOREIGN PATENTS

| Number | Country | Date |
|---|---|---|
| 728,241 | French | Apr. 11, 1932 |